(12) United States Patent
Huff

(10) Patent No.: US 7,890,680 B2
(45) Date of Patent: Feb. 15, 2011

(54) PHYSICAL LAYER DEVICE HAVING A SERDES PASS THROUGH MODE

(75) Inventor: Gary S. Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/749,129

(22) Filed: Mar. 29, 2010

(65) Prior Publication Data

US 2010/0183059 A1 Jul. 22, 2010

Related U.S. Application Data

(63) Continuation of application No. 12/007,241, filed on Jan. 8, 2008, now Pat. No. 7,721,027, which is a continuation of application No. 10/347,295, filed on Jan. 21, 2003, now Pat. No. 7,334,068.

(60) Provisional application No. 60/398,614, filed on Jul. 26, 2002.

(51) Int. Cl.
*G06F 13/12* (2006.01)
*G06F 1/12* (2006.01)

(52) U.S. Cl. .................... 710/71; 710/66; 713/400; 713/600

(58) Field of Classification Search .................. None
See application file for complete search history.

(56) References Cited

U.S. PATENT DOCUMENTS

| | | | |
|---|---|---|---|
| 4,862,452 A | 8/1989 | Milton et al. |
| 5,095,308 A | 3/1992 | Hewitt |
| 5,541,929 A | 7/1996 | Jokura |
| 5,577,023 A | 11/1996 | Marum et al. |
| 5,768,301 A | 6/1998 | Dreyer et al. |
| 5,774,814 A | 6/1998 | Haas |
| 5,790,946 A | 8/1998 | Rotzoll |
| 5,907,553 A | 5/1999 | Kelly et al. |
| 6,026,494 A | 2/2000 | Foster |
| 6,065,073 A | 5/2000 | Booth |
| 6,215,764 B1 | 4/2001 | Wey et al. |

(Continued)

FOREIGN PATENT DOCUMENTS

EP   0 573 204 A2   12/1993

(Continued)

OTHER PUBLICATIONS

10 Gigabit Ethernet Technology Overview White Paper, Revision 1.0, 10GEA: 10 Gigabit Ethernet Alliance, pp. 1-21 (May 2001).

(Continued)

*Primary Examiner*—Alan Chen
(74) *Attorney, Agent, or Firm*—Sterne, Kessler, Goldstein & Fox P.L.L.C.

(57) ABSTRACT

A physical layer device (PLD), comprising: a first serializer-deserializer (SERDES) device having a first parallel port; a second SERDES device having a second parallel port; a third SERDES device having a third parallel port; and a path selector being selectively configurable to provide either (i) a first signal path between the first and second parallel ports, or (ii) a second signal path between the first and third parallel ports.

18 Claims, 3 Drawing Sheets

U.S. PATENT DOCUMENTS

| | | |
|---|---|---|
| 6,393,050 B1 | 5/2002 | Liu |
| 6,418,558 B1 | 7/2002 | Roberts et al. |
| 6,442,142 B1 | 8/2002 | Bar-Niv |
| 6,459,393 B1 | 10/2002 | Nordman |
| 6,487,214 B1 | 11/2002 | Bachar |
| 6,516,352 B1 | 2/2003 | Booth et al. |
| 6,678,728 B1 | 1/2004 | Uppunda et al. |
| 6,691,233 B1 | 2/2004 | Gannage et al. |
| 6,697,368 B2 | 2/2004 | Chang et al. |
| 6,718,139 B1 | 4/2004 | Finan et al. |
| 6,735,244 B1 | 5/2004 | Hasegawa et al. |
| 6,812,803 B2 | 11/2004 | Goergen |
| 6,819,760 B1 | 11/2004 | Nayler |
| 6,868,088 B2 | 3/2005 | Gibson et al. |
| 6,894,602 B2 | 5/2005 | Browning |
| 6,912,485 B2 | 6/2005 | Lightfoot et al. |
| 6,999,543 B1 | 2/2006 | Trinh et al. |
| 7,020,728 B1 | 3/2006 | Jones et al. |
| 7,024,489 B2 | 4/2006 | Aviles |
| 7,027,459 B2 | 4/2006 | Fukui et al. |
| 7,054,309 B1 | 5/2006 | Hoot et al. |
| 7,058,833 B1 | 6/2006 | Bremer et al. |
| 7,079,528 B2 | 7/2006 | Ziegler et al. |
| 7,119,701 B2 | 10/2006 | Browning |
| 7,127,624 B2 | 10/2006 | Berman et al. |
| 7,149,397 B2 | 12/2006 | Popovic et al. |
| 7,203,174 B2 | 4/2007 | Huff |
| 7,227,875 B2 | 6/2007 | Deng |
| 7,257,169 B2 | 8/2007 | Shahar et al. |
| 7,283,481 B2 | 10/2007 | Huff |
| 7,324,507 B1 | 1/2008 | Lo et al. |
| 7,334,068 B2 | 2/2008 | Huff |
| 7,362,797 B2 | 4/2008 | Chan et al. |
| 7,486,721 B2 | 2/2009 | Chan et al. |
| 7,706,433 B2 | 4/2010 | Chan et al. |
| 2001/0033583 A1 | 10/2001 | Rabenko et al. |
| 2002/0019954 A1 | 2/2002 | Tran |
| 2002/0023234 A1 | 2/2002 | Berman et al. |
| 2002/0061012 A1 | 5/2002 | Thi et al. |
| 2002/0089972 A1 | 7/2002 | Chang et al. |
| 2003/0112798 A1 | 6/2003 | Ziegler et al. |
| 2003/0149922 A1 | 8/2003 | Lai |
| 2003/0179709 A1 | 9/2003 | Huff |
| 2003/0179710 A1 | 9/2003 | Huff |
| 2003/0179711 A1 | 9/2003 | Huff |
| 2003/0179771 A1 | 9/2003 | Chan et al. |
| 2003/0179816 A1 | 9/2003 | Huff et al. |
| 2003/0223469 A1 | 12/2003 | Deng |
| 2004/0017815 A1 | 1/2004 | Huff |
| 2005/0111531 A1 | 5/2005 | Booth et al. |
| 2005/0128056 A1 | 6/2005 | Browning |
| 2005/0196119 A1 | 9/2005 | Popovic et al. |
| 2007/0022310 A1 | 1/2007 | Berman et al. |
| 2008/0069004 A1 | 3/2008 | Huff |
| 2009/0135890 A1 | 5/2009 | Chan et al. |

FOREIGN PATENT DOCUMENTS

| | | |
|---|---|---|
| EP | 0 856 975 A2 | 8/1998 |
| EP | 0 856 975 A3 | 8/1998 |
| EP | 0 963 080 A2 | 12/1999 |
| EP | 1 480 391 A3 | 9/2007 |
| WO | WO 00/59176 A2 | 10/2000 |
| WO | WO 00/59176 A3 | 10/2000 |
| WO | WO 01/47159 A1 | 6/2001 |
| WO | WO 03/081785 A1 | 10/2003 |

OTHER PUBLICATIONS

BCM5411 10/100/1000 Base-T Transceiver Product Brief, Broadcom Corporation, 2 pages, Copyright 2001.

Complex programmable logic device, online at http://en.wikipedia.org/wiki/CPLD, 2 pages, last modified Jul. 1, 2007.

European Search Report for European Patent Application No. 03006505, dated Sep. 29, 2003, 3 pages.

European Search Report for European Patent Application No. 04001941.6, dated Aug. 9, 2007.

European Search Report for European Patent Application No. 03006503, dated Sep. 29, 2003, 3 pages.

International Search Report from PCT Application No. PCT/US03/08684, filed Mar. 21, 2003, 7 pages (mailing date of search report—Jul. 28, 2003).

Design Considerations for Next Generation LAN and SAN Gigabit Ethernet Switches, Cicada Semiconductor and SwitchCore Corp., pp. 1-13 (Jun. 2001).

"Power Management Method for Portable Personal Computer with Modem" IBM Technical Disclosure Bulletin, vol. 38, No. 2, pp. 259-260, XP000502465, (Feb. 1995).

www.wikipedia.com —>CPLD, last modified May 12, 2006.

Search Report for European App. No. EP 03006502.3, dated Aug. 12, 2003, completed Aug. 5, 2003, by Lai, C., 3 pgs.

Final/Partial Search Report for European App. No. EP 03006504, dated Sep. 29, 2003, 2 pgs.

Search Report for European App. No. EP 1 480 391 A3, dated Aug. 2, 2007, 2 pgs.

PHYSICAL LAYER DEVICE HAVING A SERDES PASS THROUGH MODE

CROSS-REFERENCE TO RELATED APPLICATIONS

This application is a continuation of U.S. application Ser. No. 12/007,241, filed Jan. 8, 2008, now U.S. Pat. No. 7,721,027, which is a continuation of U.S. application Ser. No. 10/347,295, filed Jan. 21, 2003, now U.S. Pat. No. 7,334,068, which claims priority to U.S. Provisional Application No. 60/398,614, filed Jul. 26, 2002, each of which is incorporated herein in by reference in its entirety.

BACKGROUND OF THE INVENTION

1. Field of the Invention

The present invention relates generally to data communications.

2. Background

A data communication network includes multiple communication devices and a connection infrastructure or medium for interconnecting or networking the communication devices. The communication devices may include stand-alone computers or embedded controllers. Often, the communication devices include or connect with high-speed analog serial data interfaces or ports configured to operate at Gigabit-per-second (Gbps) data rates. Typically, the serial data interfaces are configured in accordance with known data transmission standards, such as optical fiber and copper wire Ethernet standards. Therefore, there is a need for a connection infrastructure capable of interfacing with such high-speed analog serial data interfaces. It is desirable that the connection infrastructure be capable of operating at the Gigabit-per-second data rates, and in accordance with the different transmission standards.

At any given time, only a subset, such as two, of the communication devices may need to communicate with each other. A direct data connection or path between the two communication devices facilitates high-speed data communication. Over time, different subsets of communication devices require different direct path connections. Therefore, it is desirable that the connection infrastructure be capable of being selectively configurable to provide the different direct path connections between communication devices.

SUMMARY

In an embodiment, the present invention is directed to a communication infrastructure or medium, referred to herein as a physical layer device (PLD), for selectively interconnecting multiple communication devices through high-speed serial data interfaces. The PLD supports high-speed serial data exchanges between the communication devices, at gigabit-per-second data rates. The PLD supports different data transmission interfaces and standards, such as Ethernet optical fiber and copper line serial data interface standards. The PLD is capable of being selectively configurable to provide different direct path connections between different communication devices.

In an embodiment, the PLD is constructed on a integrated circuit (IC) chip, and includes a first serializer-deserializer (SERDES) device having a first parallel port. The first SERDES device also includes a first serial port coupled to a first communication device. The PLD includes a second SERDES device having a second parallel port. The second SERDES device also includes a second serial port coupled to a second communication device. The PLD also includes a third SERDES device having a third parallel port. The third SERDES device also includes a third serial port coupled to a third communication device. The PLD further includes a path selector that is selectively configurable to provide either (i) a first signal path for routing first deserialized data between the first and second parallel ports, or (ii) a second signal path for routing second deserialized data between the first and third parallel ports. Thus, the first and second communication devices can communicate through the first SERDES devices and the path selector, while the first and third communication devices can communicate through the first and third SERDES devices and the path selector.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings/Figures, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements. In the drawings, the indicators "D," "S," "d" and "c" respectively indicate or represent "Deserializer," "Serializer," "data signal," and "clock signal."

DETAILED DESCRIPTION OF THE INVENTION

Figure 1:
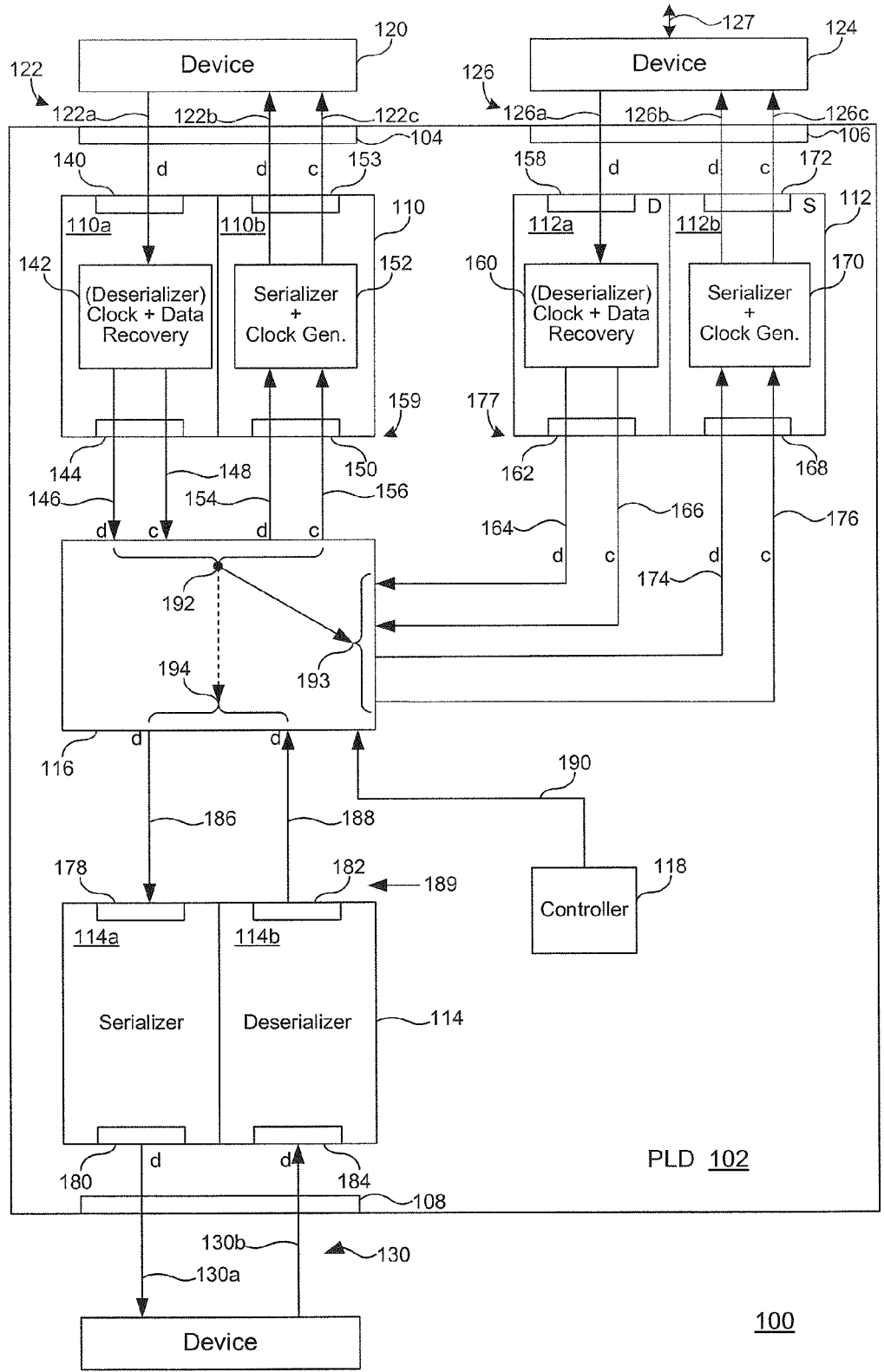
FIG. 1 is a block diagram of an example system in which an example physical layer device (PLD) may operate.

FIG. 1 is a block diagram of an example system 100 in which embodiments of the present invention may operate. System 100 includes a physical layer device (PLD) 102 operated and constructed in accordance with the present invention. In an embodiment, PLD 102 is constructed on a single integrated circuit (IC) substrate or chip. PLD 102 may be implemented in Complementary Metal Oxide Semiconductor (CMOS) technology, for example. Other semiconductor technologies may be used.

PLD 102 includes multiple input/output (I/O) ports 104, 106 and 108. I/O ports 104-108 represent connectors, conductive traces, PLD I/O pins, receivers and drivers, and the like, associated with coupling signals to and from PLD 102. PLD 102 includes a serializer-deserializer (SERDES) device 110 coupled to I/O port 104, a SERDES device 112 coupled to I/O port 106, and a SERDES device 114 coupled to I/O port 108. Each SERDES device includes (i) a transmitter/serializer (S) for serializing a parallel data signal, to produce a serial data signal, and (ii) a receiver/deserializer (D) for deserializing a serial data signal, to produce a parallel data signal, as is described in detail below. PLD 102 also includes a path selector 116 coupled between SERDES devices 110, 112 and 114, and a controller 118 for controlling path selector 116.

PLD 102 interfaces with a communication or network device 120 through I/O port 104 and a high-speed analog serial data interface 122 (where the I/O port and the data interface are collectively referred to as a serial interface of PLD 102). Network device 120 may be a Media Access Controller (MAC). Serial data interface 122 includes bi-directional serial data signals 122a and 122b, and a clock signal 122c synchronized with serial data signal 122b. Bi-directional serial data signals 122a and 122b have example baud rates of 1.25 Gbps, and clock signal 122c has a corresponding example clock rate or frequency of 1.25 GHz.

PLD 102 interfaces with an optical fiber module 124 through I/O port 106 and a high-speed analog serial data interface 126 (where the I/O port and the data interface are collectively referred to as a serial interface of PLD 102). High-speed serial data interface 126 includes bi-directional analog serial data signals 126a and 126b having example baud rates in the gigabit-per-second range. Serial interface 126 also includes a clock signal 126c synchronized with and having a frequency commensurate with serial data signal 126b. Optical fiber module 124 interfaces with an optical line 127. Optical fiber module 124 may operate in accordance with IEEE 802.3 for 1000 Base-X, for example.

SERDES device 114 interfaces with a communication or network device 128 through I/O port 108 and a high-speed analog serial data interface 130 (where the I/O port and the data interface are collectively referred to as a serial interface of PLD 102). Serial data interface 130 includes bi-directional serial data signals 130a and 130b having baud rates in the Gbps range. Serial data signals 130a and 130b may be carried over a copper line associated with an Ethernet link, for example, coupled to I/O port 108. SERDES device 114 may be an Ethernet transceiver that operates in accordance with IEEE 802.3 for 10/100/1000 Base-T, for example. It is understood that optical fiber module 124 and SERDES device 114 are exemplary and may be replaced by a multitude of other interface devices in other arrangements of the present invention. For example, SERDES device 112 and optical system 124 and 127 may be replaced with a transceiver and an associated interface suitable for copper-based signals, while SERDES device 114 and associated interface 130 may be replaced by a transceiver and interface suitable for optical signals, and so on.

SERDES device 110 includes a deserializer 110a and a serializer 110b. Deserializer 110a includes a deserializer input 140, a clock and data recovery module 142, and deserializer output 144. In operation, communication device 120 transmits serial data signal 122a to deserializer input 140. Clock and data recovery module 142 deserializer serial data signal 122a received at deserializer input 140, to produce a deserialized data signal 146. The terms "deserializes" and "deserializing" mean to convert serial data to parallel data. Clock and data recovery module 142 recovers a clock signal 148 from received serial data signal 122a. Recovered clock signal 148 represents received signal timing, for example, the timing of data symbols included in received serial data signal 122a. Deserializer 110a transmits signals 146 and 148 from deserializer output 144. Clock signal 148 is synchronous with data signal 146.

Clock and data recovery module 142 generates deserialized data signal 146 as a series of N1-bit wide parallel digital data words, having a data rate equal to R1/N1, where R1 is the data rate of received serial data signal 122a. Thus, the aggregate data rate of deserialized data signal 146 is equal to the data rate of serial data signal 122a. Module 142 generates clock signal 148 synchronously with deserialized data signal 146, and at a frequency equal to R1/N1. In an example arrangement, N1=10 and R1=1.25 GHz. Thus, serial data signal 122a has a data rate of 1.25 GHz, module 142 generates 10-bit parallel words at a data rate of 125 MHz (1.25 GHz=10 times 125 MHz), and clock signal 148 has a frequency of 125 MHz.

Serializer 110b includes a serializer input 150, a serializer and clock generator module 152, and a serializer output 153. In configurations to be described below, path selector 116 provides a deserialized data signal 154 and an associated clock signal 156 to deserializer input 150. Serializer and clock generator 152 serializes deserialized data signal 154 in accordance with clock signal 156, to produce serialized data signal 122b. The terms "serializes" and "serializing" mean to convert parallel data to serial data. Serializer and clock generator 152 also produces clock signal 122c synchronous with serial data signal 122b. Serializer 110b transmits signals 122b and 122c from serializer output 153.

In an example arrangement, deserialized data signal 154 includes a series of N2-bit wide parallel digital data words, having a data rate equal to R2/N2, where R2 is the data rate of received serial data signal 126a. Thus, the aggregate data rate of deserialized data signal 154 is equal to the data rate of serial data signal 126a. Also, clock signal 156 is synchronous with deserialized data signal 154, and has a frequency equal to R2/N2. In an example arrangement, N2=10 and R2=1.25 GHz. Thus, serial data signal 126a has a data rate of 1.25 GHz, data signal 154 includes 10-bit parallel words at a data rate of 125 MHz (1.25 GHz=10 times 125 MHz), and clock signal 156 has a frequency of 125 MHz. Based on these data and clock rates, serializer 152 generates serial data signal 122b at a data rate of 1.25 GHz, and clock signal 122c at a frequency of 1.25 GHz.

The terms "deserialized" and "parallel" are used equivalently and interchangeably herein. Also, a deserializer output is a parallel data output and a serializer input is a parallel data input. Together, a deserializer output (e.g., deserializer output 144) and a serializer input (e.g., serializer input 150) represent a parallel port of a SERDES device (e.g., a parallel port of SERDES device 110). Similarly, a deserializer input (e.g., deserializer input 140) and a serializer output (e.g., serializer output 153) collectively represent a serial port of a SERDES device (e.g., a serial port of SERDES device 110).

SERDES 112 includes a deserializer 112a and serializer 112b. Deserializer 112a includes a serializer input 158, a clock and data recovery module 160, and a deserializer output 162. Deserializer 112a operates in substantially the same way as deserializer 110a. Serializer input port 158 receives serial data signal 126a. Clock and data recovery module 160 deserializes received serial data signal 126a, to produce deserialized or parallel data signal 164. Module 160 also recovers a clock signal 166 from received serial data signal 126a. From deserializer output 162, deserializer 112a transmits signals 164 and 166 to path selector 116.

Serializer 112b operates in substantially the same way as serializer 110b. In configurations to be described below, path selector 116 provides a deserialized or parallel data signal 174 and its associated clock signal 176 to serializer input 168. Serializer and clock generator module 170 serializes deserialized data 174 in accordance with clock signal 176, to produce serial data signal 126b and its associated clock signal 126c. Data signal 126b and clock signal 126c have example data and clock rates in the GHz range. Together, deserializer output 162 and serializer input 168 represent a parallel port 177 of SERDES device 112. SERDES device 112 supports example data rates and uses parallel data bit-widths similar to or the same as those of SERDES device 110, mentioned above. In an alternative arrangement, module 170 generates only a serial data signal that essentially encapsulates both data and clock signals 126b and 126a.

SERDES 114 includes a serializer 114a and a deserializer 114b. Serializer 114a includes a serializer input 178 and a serializer output 180. Deserializer 114b includes a deserializer input 184 and a deserializer output 182. In configurations to be described below, path selector 116 provides a deserialized data signal 186 to serializer input 178. Serializer 114a serializes deserialized data signal 186 into serialized data signal 130a, and transmits the serialized data signal from serializer output 180. Deserializer 114b receives serial data signal 130b at deserializer input 184. Deserializer 114b deserializes serial data signal 130b, to produce deserialized data signal 188. Deserializer 114b transmits deserialized data signal 188 to path selector 116, from deserializer output 182. Together, deserializer output 182 and serializer input 178 represent a parallel port 189 of SERDES device 114. SERDES device 114 may support example data rates similar to or the same as those of SERDES devices 110 and 112, mentioned above. SERDES device 114 may support parallel data bit-widths different from those used with SERDES devices 110 and 112, for the reason discussed below in connection with FIG. 3. In another embodiment, SERDES device 114 generates clock signals associated with data signals in a manner similar to SERDES devices 110 and 112.

Controller 118 provides a control signal 190 to path selector 116. Control signal 190 selects alternative first and second configurations of path selector 116. That is, path selector 116 is selectively configurable responsive to control signal 190. At a high level, path selector 116 can be considered to include a switch having connection nodes 192, 193 and 194, respectively coupled to parallel ports 159, 177 and 189. The switch has selectable first and second positions corresponding to the first and second configurations mentioned above.

The first switch position (depicted in FIG. 1) couples together nodes 192 and 193, while the second position couples together nodes 192 and 194. Thus, in the first switch position, selector 116 couples parallel port 159 to parallel port 177, whereby bi-directional de-serialized data signals and their associated clock signals are routed between these parallel ports. This configuration is referred to as a SERDES pass-through mode. Alternatively, in the second switch position, selector 116 couples parallel port 159 to parallel port 189, whereby bi-directional serial data signals are routed between these parallel ports. Thus, path selector 116 is selectively configurable to provide either:

(i) in a first configuration, a bi-directional signal path between parallel port 159 of SERDES device 110 and parallel port 177 of SERDES device 112; or (ii) in a second configuration, a bi-directional signal path between parallel port 159 of SERDES device 110 and parallel port 189 of SERDES device 114.

The bi-directional signal paths provided by path selector 116 carry parallel data, and clock signals when appropriate, between the respective parallel ports of SERDES devices 110, 112, and 114. The first configuration of path selector 116 essentially interconnects communication or network devices 120 and 124, whereby these devices can exchange data with each other at Gbps data rates, through PLD 102. More specifically, devices 120 and 124 exchange data through their respective serial interfaces, SERDES devices 110 and 112, and path selector 116.

The second configuration of path selector 116 essentially interconnects communication or network devices 120 and 128, whereby these devices can also exchange data at Gbps data rates through their respective serial interfaces, SERDES devices 110 and 114, and path selector 116. From the perspective of device 120, PLD 102 provides a single IC chip connection infrastructure that selectively interconnects device 120 to either of devices 124 and 128, through the single serial interface (122) of device 120. This reduces the number of communication ports associated with device 120, and the number of I/O pins required on any communication port of device 120 that interfaces with PLD 102.

Figure 2B:
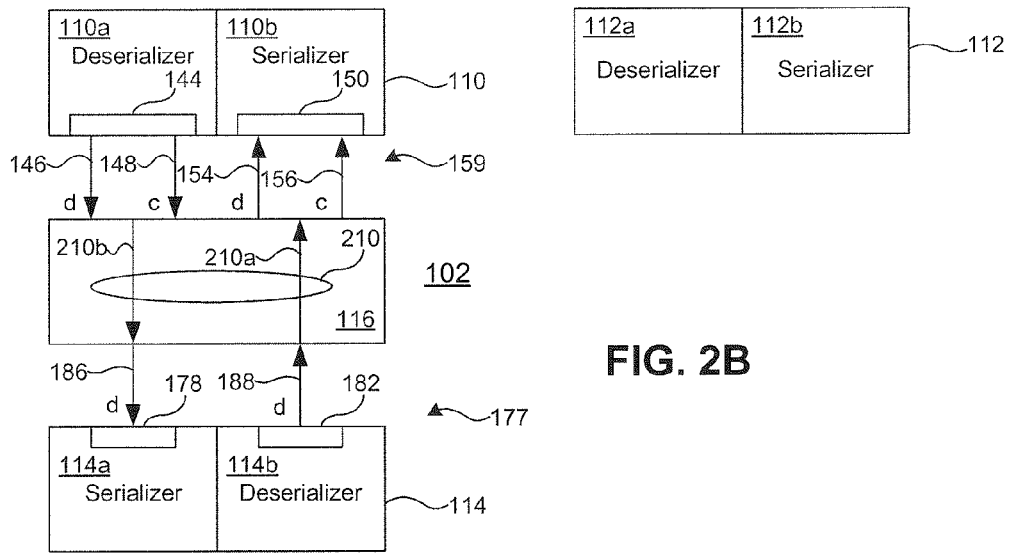
FIG. 2B is a block diagram of a portion of the PLD of FIG. 1, corresponding to when the path selector is in a second configuration.
Figure 2A:
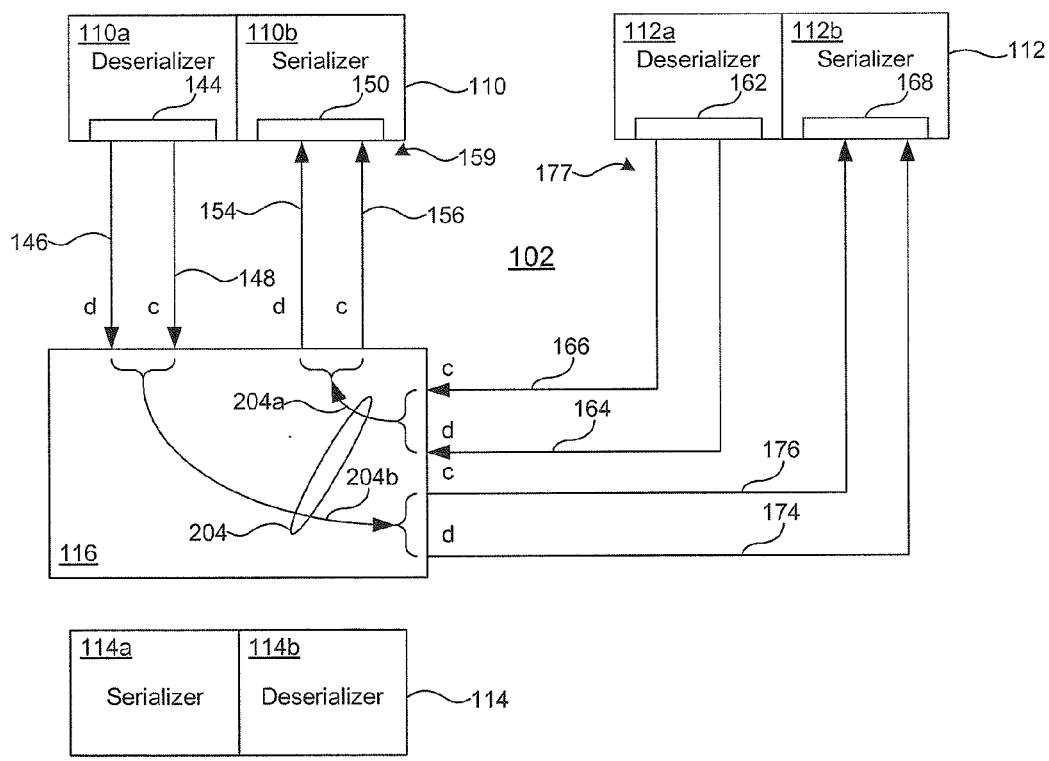
FIG. 2A is a block diagram of a portion of the PLD of FIG. 1, corresponding to when a path selector of the PLD is in a first configuration.

FIG. 2A is a block diagram of a portion of PLD 102 corresponding to when path selector 116 is in, or set to, the first configuration. In the first configuration, path selector 116 provides bi-directional signal paths 204a and 204b (collectively, bi-directional signal path 204) for routing signals between parallel port 159 of SERDES device 110 and parallel port 177 of SERDES device 112. Specifically, signal path 204a routes data and clock signals 164 and 166 from deserializer output 162 to serializer input 150. In the first configuration, data signals 154 and 164 are the same and clock signals 156 and 166 are the same. Also, signal path 204b routes data and clock signals 146 and 148 from deserializer output 144 to serializer input 168. In this configuration, deserialized data signals 174 and 146 are the same and recovered clock signals 176 and 148 are the same.

FIG. 2B is a block diagram of a portion of PLD 102 corresponding to when path selector 116 is in the second configuration. In the second configuration, path selector 116 provides bi-directional signal paths 210a and 210b (collectively, bi-directional signal path 210) for routing bi-directional deserialized data signals between parallel port 159 and parallel port 177. Specifically, signal path 210a routes data signal 188 from deserializer output 182 to serializer input 150. In the first configuration, data signals 188 and 154 carry the same data content. Also, signal path 204b routes data signal 146 from deserializer output 144 to serializer input 178. In this configuration, deserialized data signals 146 and 186 carry the same data content. In the second configuration, path selector 116 generates clock signal 156 synchronous with data signal 154, in the manner described below in connection with FIG. 3.

Figure 3:
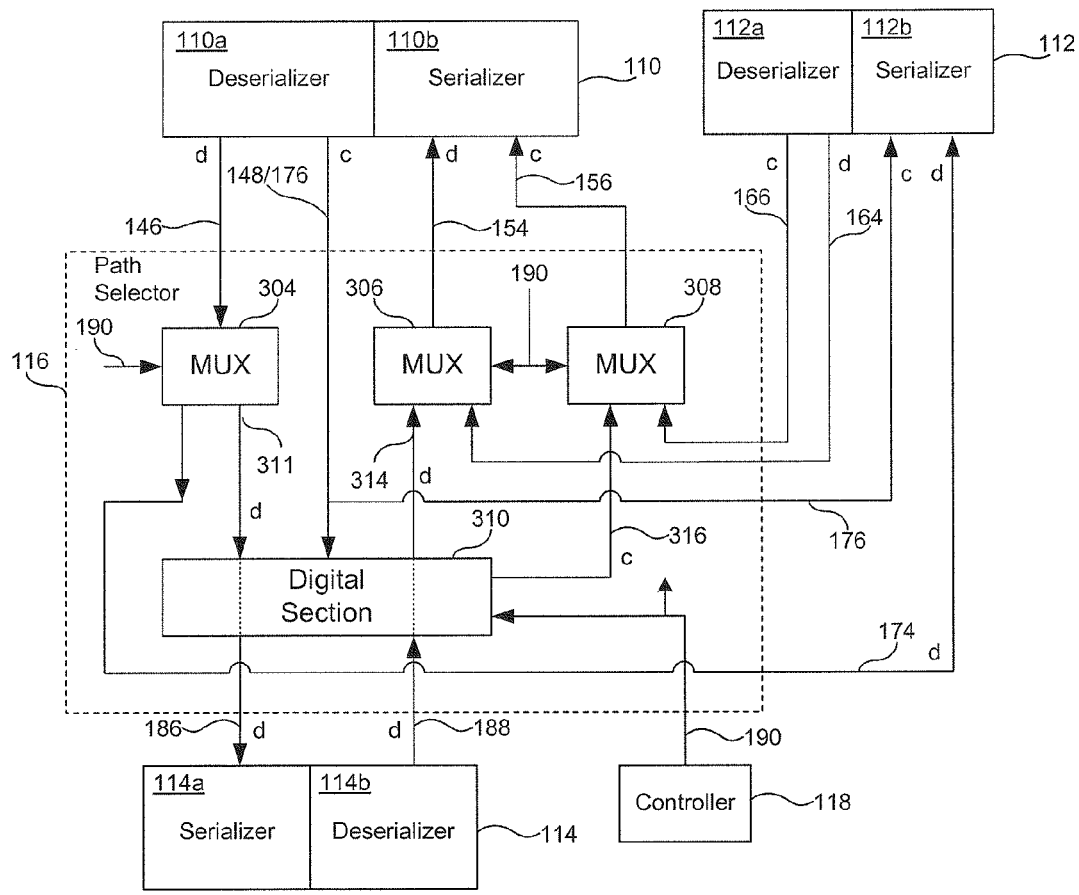
FIG. 3 is a block diagram of an example arrangement of the path selector.

FIG. 3 is a block diagram of an example arrangement of path selector 116. All of the data signal paths depicted in FIG. 3 are parallel data paths. Path selector 116 includes a plurality of multiplexers or selectors 304, 306 and 308, and a digital processor section 310 (also digital section). Controller 118 configures each of the mutiplexers or selectors 304-308 and digital section 310 as appropriate to set path selector 116 in either the first configuration or the second configuration, according to control signal 190. Thus, mutiplexers 304, 306 and 308 are collectively referred to herein as multiplexer logic that is configurable to support either the first or second configuration according to control signal 190.

Controller 118 sets control signal 190 to either a first value or a second value to respectively set path selector 116 to either the first configuration or the second configuration. For example, in an arrangement where control signal is a digital signal, controller 118 sets control signal to either a logic "0" or a logic "1" to respectively configure path selector 116 in either the first configuration or the second configuration. Alternatively, the polarity of control signal 190 may be reversed. In another arrangement, controller 118 generates multiple control signals.

Digital section 310 includes digital control and signal processing logic to perform exemplary functions such as data encoding, data packetizing, data decoding and data depacketizing, when path selector 116 is set to the second configuration, as described below. Digital section 310 also includes an enable circuit (not shown) to selectively disable or enable the operation of the digital section responsive to control signal 190, when path selector 116 is in the first and second configurations, respectively. In an arrangement, the enable circuit is a switch, connected between a power supply rail of PLD 102 and operational circuits of digital section 310, responsive to control signal 190. The switch removes power from the operational circuits of digital section 310, to disable the digital section, when path selector 116 is set to the first configuration. In the second configuration, the switch applies power to the operational circuits of digital section 310, to enable the digital section.

When control signal 190 sets path selector 116 to the first configuration, the path selector operates as follows. Multiplexer 304 passes deserialized data signal 146 to serializer 112b, as deserialized data signal 174. Multiplexer 306 passes deserialized data signal 164 to serializer 110b, as deserialized data signal 154. Multiplexer 308 passes clock signal 166 to serializer 110b, as clock signal 156. Clock signal 148 passes from deserializer 110a, directly through path selector 116, to serializer 112b. Thus, the first signal path through path selector 116 includes multiplexers 304, 306 and 308 configured as just described.

When control signal 190 sets path selector 116 to the second configuration, the path selector operates as follows. Multiplexer 304 passes deserialized data signal 146 to an input of digital section 310, as data signal 311. Digital section 310 processes deserialized data signal 311/146, to produce deserialized data signal 186. For example, digital section 310 may reformat deserialized data signal 146 by removing error correction and packet protocol bits from deserialized data signal 146. Digital section 310 also receives deserialized data signal 188 from deserializer 114b. Digital section 310 generates a deserialized data signal 314 from deserialized data signal 188. For example, digital section 310 may reformat deserialized data signal 188 by adding error correction and packet protocol bits to the signal 188.

Multiplexer 306 passes deserialized data signal 314 to serializer 110b, as deserialized data signal 154. Digital section 310 generates a data clock 316 synchronous with deserialized data signal 314. Multiplexer 308 passes data clock 316 to serializer 110b, as clock signal 156. Thus, the second signal path through path selector 116 includes multiplexers 304, 306 and 308, and digital section 310, configured as just described.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application specific integrated circuits, firmware, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A physical layer device (PLD), comprising:
a first serializer-deserializer (SERDES) device;
a second SERDES device; and
a path selector, coupled between the first SERDES device and the second SERDES device, configured:
(i) to pass a first deserialized data signal and a first clock signal from the first SERDES device to the second SERDES device, and
(ii) to pass a second deserialized data signal and a second clock signal from the second SERDES device to the first SERDES device,
wherein the first clock signal and the second clock signal are synchronized with the first deserialized data signal and the second deserialized data signal, respectively.

2. The PLD of claim 1, wherein the first SERDES device is configured to deserialize a first serial data signal to provide the first deserialized data signal and the first clock signal, and wherein the first clock signal is recovered from the first serial data signal and synchronized with the first deserialized data signal.

3. The PLD of claim 1, wherein the first SERDES device is configured to serialize the second deserialized data signal in accordance with the second clock signal.

4. The PLD of claim 3, wherein the first SERDES device is further configured to provide a third clock signal synchronized with the second deserialized data signal.

5. The PLD of claim 1, further comprising:
a controller module configured to provide a control signal to the path selector.

6. The PLD of claim 5, wherein the path selector comprises:
a plurality of path configurations, one of the plurality of path configurations being a path configuration from the first SERDES device to the second SERDES device,
wherein the path selector is further configured to select the path configuration from the first SERDES device to the second SERDES device in response to the control signal.

7. The PLD of claim 5, wherein the path configuration from the first SERDES device to the second SERDES device is a bi-directional signal path.

8. The PLD of claim 5, wherein the path selector comprises:
a first multiplexer configured to pass the first deserialized data signal to the second SERDES device in response to the control signal;
a second multiplexer configured to pass the second clock signal to the first SERDES device in response to the control signal; and
a third multiplexer configured to pass the second deserialized data signal to the first SERDES device in response to the control signal,
wherein the path selector directly provides first clock signal to the second SERDES device.

9. A path selector for a physical layer device (PLD), comprising:
a first bi-directional signal path configured and arranged to pass a first deserialized data signal and a first clock signal from a first serializer-deserializer (SERDES) device to a second SERDES device, wherein the first clock signal is synchronized with the first deserialized data signal; and a second bi-directional signal path configured and arranged to pass the first deserialized data signal and the first clock signal from the first SERDES device to a third SERDES device, wherein the path selector is configured to select from among the first bi-directional signal path and the second bi-directional signal path in response to a control signal.

10. The PLD of claim 9, wherein the first SERDES device is configured to deserialize a first serial data signal to provide the first deserialized data signal and the first clock signal, and wherein the first clock signal is recovered from the first serial data signal and synchronized with the first deserialized data signal.

11. The path selector of claim 9, further comprising:

a controller module configured to provide the control signal to the path selector, the control signal having a first value and a second value, wherein the path selector is configured to select the first bi-directional signal path when the control signal is at the first value and to select the second bi-directional signal path when the control signal is at the second value.

12. The PLD of claim 11, wherein the path selector comprises:

a plurality of multiplexers configurable to form the first bi-directional signal path when the control signal is at the first value and to form the second bi-directional signal path when the control signal is at the second value.

13. A method for data communication, comprising:

(a) deserializing, by a first serializer-deserializer (SERDES) device, a first serial data signal to produce a first deserialized data signal;

(b) recovering, by the first SERDES device, a first clock signal from the first serial data signal;

(c) selecting a signal path from among a plurality of signal paths in a path selector to pass the first deserialized data signal and the first clock signal from the first SERDES device to the second SERDES device;

(d) receiving, by a second SERDES device, the first deserialized data signal and the first clock signal; and (e) serializing, by the second SERDES device, the first deserialized data signal in accordance with the first clock signal to produce a second serial data signal.

14. The method of claim 13, wherein step (e) comprises:

(e)(i) serializing the first deserialized data signal in accordance with the first clock signal to produce the second serial data signal and a second clock signal, wherein the second clock signal is synchronized with the second serial data signal.

15. The method of claim 13, wherein step (c) comprises:

(c)(i) providing a control signal to the path selector.

16. The method of claim 15, wherein step (c) further comprises:

(c)(ii) selecting the signal path in response to the control signal.

17. The method of claim 16, wherein step (c)(ii) comprises:

(c)(ii)(A) configuring a plurality of multiplexers to form the signal path in response to the control signal.

18. The method of claim 16, wherein step (c) further comprises:

(c)(iii) routing the first deserialized data signal and the first clock signal to the second SERDES device using the signal path.

* * * * *